US007836491B2

(12) United States Patent
Yamazaki et al.

(10) Patent No.: US 7,836,491 B2
(45) Date of Patent: Nov. 16, 2010

(54) SYSTEM FOR IDENTIFYING AN INDIVIDUAL, A METHOD FOR IDENTIFYING AN INDIVIDUAL OR A BUSINESS METHOD

(75) Inventors: Shunpei Yamazaki, Tokyo (JP); Jun Koyama, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 820 days.

(21) Appl. No.: 09/842,219

(22) Filed: Apr. 26, 2001

(65) Prior Publication Data

US 2002/0001400 A1    Jan. 3, 2002

(30) Foreign Application Priority Data

Apr. 26, 2000    (JP)    ............................. 2000-126513

(51) Int. Cl.
*G06F 7/04*     (2006.01)
*G06F 15/16*    (2006.01)
*G06F 21/00*    (2006.01)
*G06K 9/00*     (2006.01)

(52) U.S. Cl. ................. 726/6; 726/5; 726/28; 713/186; 340/5.82; 340/5.83; 340/5.84; 340/5.52; 340/5.53; 902/3

(58) Field of Classification Search ................. 713/202, 713/184, 186; 340/5.52–5.53, 5.82–5.84; 902/3; 726/5, 6
See application file for complete search history.

(56) References Cited

U.S. PATENT DOCUMENTS

| | | | | |
|---|---|---|---|---|
| 4,229,237 A | | 10/1980 | Bensahel et al. | |
| 4,263,056 A | | 4/1981 | Bensahel et al. | |
| 4,532,508 A | * | 7/1985 | Ruell | .......................... 340/5.83 |
| 4,582,985 A | * | 4/1986 | Lofberg | ........................ 235/380 |
| 4,747,147 A | * | 5/1988 | Sparrow | ....................... 382/125 |
| 4,993,068 A | | 2/1991 | Piosenka et al. | |
| 5,091,942 A | * | 2/1992 | Dent | ............................ 380/46 |
| 5,280,527 A | | 1/1994 | Gullman et al. | |
| 5,412,727 A | * | 5/1995 | Drexler et al. | ............... 713/186 |
| 5,420,936 A | | 5/1995 | Fitzpatrick et al. | |
| 5,446,290 A | | 8/1995 | Fujieda et al. | |

(Continued)

FOREIGN PATENT DOCUMENTS

DE    19809006    9/1999

(Continued)

OTHER PUBLICATIONS

IBM TDB, "Palm Pilot for Credit/Debit/Cash Card with Biometric Authentication", May 1999, vol. 42, Issue 421.*

(Continued)

*Primary Examiner*—Matthew T Henning
(74) *Attorney, Agent, or Firm*—Fish & Richardson P.C.

(57) ABSTRACT

An individual may be identified by using a portable communication device. Biological information of the user is input into the communication device. The inputted biological information of the user is checked with reference biological information previously stored in the portable communication device. The portable communication device is connected to the Internet after the inputted biological information of the user and the reference biological information have matched. Then information that the inputted biological information of the user and the reference biological information have matched is transmitted to a server from the portable communication device.

27 Claims, 11 Drawing Sheets

U.S. PATENT DOCUMENTS

| | | | |
|---|---|---|---|
| 5,559,504 A * | 9/1996 | Itsumi et al. | 340/5.53 |
| 5,615,277 A * | 3/1997 | Hoffman | 382/115 |
| 5,623,552 A * | 4/1997 | Lane | 382/124 |
| 5,627,364 A | 5/1997 | Codama et al. | |
| 5,719,950 A * | 2/1998 | Osten et al. | 382/115 |
| 5,764,789 A * | 6/1998 | Pare et al. | 382/115 |
| 5,845,016 A | 12/1998 | Matsui et al. | |
| 5,872,834 A * | 2/1999 | Teitelbaum | 379/93.03 |
| 5,929,845 A | 7/1999 | Wei et al. | |
| 5,930,804 A * | 7/1999 | Yu et al. | 707/104.1 |
| 5,966,112 A | 10/1999 | Katagiri et al. | |
| 5,970,405 A * | 10/1999 | Kaplan et al. | 455/410 |
| 6,016,476 A * | 1/2000 | Maes et al. | 705/18 |
| 6,021,212 A * | 2/2000 | Ho | 382/124 |
| 6,026,293 A * | 2/2000 | Osborn | 455/411 |
| 6,028,581 A | 2/2000 | Umeya | |
| 6,040,810 A | 3/2000 | Nishimura | |
| 6,070,796 A | 6/2000 | Sirbu | |
| 6,076,167 A | 6/2000 | Borza | |
| 6,104,922 A * | 8/2000 | Baumann | 455/410 |
| 6,141,436 A | 10/2000 | Srey et al. | |
| 6,144,757 A | 11/2000 | Fukuzumi | |
| 6,175,922 B1 | 1/2001 | Wang | |
| 6,219,793 B1 * | 4/2001 | Li et al. | 713/202 |
| 6,243,155 B1 | 6/2001 | Zhang et al. | |
| 6,324,271 B1 * | 11/2001 | Sawyer et al. | 379/142.05 |
| 6,327,347 B1 * | 12/2001 | Gutzmann | 379/88.02 |
| 6,327,376 B1 | 12/2001 | Harkin | |
| 6,345,047 B1 * | 2/2002 | Regnier | 370/352 |
| 6,445,932 B1 | 9/2002 | Soini et al. | |
| 6,446,210 B1 | 9/2002 | Borza | |
| 6,456,279 B1 | 9/2002 | Kubo et al. | |
| 6,476,374 B1 | 11/2002 | Kozlowski et al. | |
| 6,484,260 B1 | 11/2002 | Scott et al. | |
| 6,490,366 B1 | 12/2002 | Haneda et al. | |
| 6,539,101 B1 | 3/2003 | Black | |
| 6,547,130 B1 | 4/2003 | Shen | |
| 6,587,873 B1 | 7/2003 | Nobakht et al. | |
| 6,594,505 B1 | 7/2003 | Ishii | |
| 6,628,810 B1 | 9/2003 | Harkin | |
| 6,657,538 B1 | 12/2003 | Ritter | |
| 6,747,638 B2 | 6/2004 | Yamazaki et al. | |
| 6,751,733 B1 | 6/2004 | Nakamura et al. | |
| 6,751,734 B1 | 6/2004 | Uchida | |
| 6,760,324 B1 * | 7/2004 | Scott et al. | 370/352 |
| 6,839,798 B1 * | 1/2005 | Nagayoshi et al. | 711/103 |
| 6,907,134 B1 * | 6/2005 | Yamada et al. | 382/115 |
| 6,910,131 B1 * | 6/2005 | Yamada et al. | 713/186 |
| 6,957,337 B1 * | 10/2005 | Chainer et al. | 713/186 |
| 6,963,660 B1 * | 11/2005 | Tsukamura et al. | 382/124 |
| 6,980,669 B1 * | 12/2005 | Uchida | 382/115 |
| 6,983,061 B2 * | 1/2006 | Ikegami et al. | 382/115 |
| 6,990,587 B2 * | 1/2006 | Willins et al. | 713/182 |
| 6,996,839 B1 * | 2/2006 | Edwards | 726/5 |
| 7,039,812 B2 * | 5/2006 | Kawan et al. | 713/186 |
| 7,124,300 B1 * | 10/2006 | Lemke | 713/186 |
| 2001/0013546 A1 * | 8/2001 | Ross | 235/382 |
| 2001/0030704 A1 | 10/2001 | Kimura | |
| 2001/0031074 A1 | 10/2001 | Yamazaki et al. | |
| 2001/0047479 A1 | 11/2001 | Bromba et al. | |
| 2002/0141586 A1 * | 10/2002 | Margalit et al. | 380/270 |

FOREIGN PATENT DOCUMENTS

| | | |
|---|---|---|
| DE | 20008345 | 8/2000 |
| EP | 0 593 386 | 4/1994 |
| EP | 0 986 209 A2 | 3/2000 |
| GB | 2 312 040 A | 10/1997 |
| GB | 2348309 | 9/2000 |
| JP | 11-203041 | 7/1999 |
| WO | WO 98/25385 | 6/1988 |
| WO | WO 98/11750 | 3/1998 |
| WO | WO98-40962 | 9/1998 |
| WO | WO 98/50875 | 11/1998 |
| WO | 99/18590 A1 | 4/1999 |
| WO | WO99-24938 | 5/1999 |
| WO | WO99-28701 | 6/1999 |
| WO | WO00-17823 | 3/2000 |
| WO | 00/63769 A1 | 10/2000 |

OTHER PUBLICATIONS

Kobayashi, Tetsuji "A Fingerprint Image Recognition Method for Network User Identification", 1992, IEEE, pp. 369-372.*

Japanese Patent Laid-Open No. 11-345264 (English Abstract attached) Dec. 14, 1999.

Japanese Patent Laid-Open No. 2001-5945 (English Abstract attached) Jan. 12, 2001.

Japanese Patent Laid-Open No. 2000-276445 (English Abstract attached) Oct. 6, 2000.

Anna Stockel; "Securing Data and Financial Transactions"; *Security Technology, 1995 Proceedings*; pp. 397-401; Institute of Electrical and Electronics Engineers 29th Annual 1995 International Carnahan Conference onSanderstead, UK; Oct. 18-20, 1995.

Hyun-Jung; "Biometrics, Is it a Viable Proposition for Identity Authentication and Access Control?"; *Computers & Security*, vol. 14; pp. 205-214; 1995.

Tetsuji Kobayashi; "A Fingerprint Image Recognition Method for Network User Identification"; *Computing and Information, 1992 Proceedings*; pp. 369-372; ICCI'92, Fourth International Conference on Toronto, Ontario, Canada; May 28-30, 1992.

European Search Report (Application No. 01111375), Feb. 2, 2004, 3 pages.

European Search and Examination Report; Application No. EP 06 00 2933; Apr. 10, 2006 (4 pages).

* cited by examiner

SYSTEM FOR IDENTIFYING AN INDIVIDUAL, A METHOD FOR IDENTIFYING AN INDIVIDUAL OR A BUSINESS METHOD

FIELD OF THE INVENTION

The present invention relates to a system for identifying an individual or a method for identifying an individual, and especially a system for identifying an individual, a method for identifying an individual or a business method which is characterized by identifying an individual by means of biological information.

DESCRIPTION OF THE PRIOR ART

In recent years, communication technology for connecting to the Internet by means of communication devices such as a portable telephone, personal computer, or portable information terminal is developing rapidly. Connection to the Internet in homes, offices, etc., is carried out by connecting a telephone line to an installed personal computer. Recently, especially, portable telephones, such as i-mode, which permit of use of the Internet easily became popular and various exchanges of information have been carried out in a simple manner.

When executing a transaction for handling money, for example, on the Internet by means of communication devices, confirmation of an individual (process for identifying an individual) is required. The process for identifying an individual is carried out by transmitting a personal identification number, which has been registered to the opposite end in advance from the user to the opposite end, and checking the personal identification number at the opposite end.

In FIG. 11, the conventional flow for identifying an individual is shown. At first, the user makes a connection with the Internet and transmits the numerical value for identification to the opposite end under conditions specified by the opposite end of transaction. The opposite end that has received the data for identification as a numerical value executes a checking of the numerical value sent from the user with the personal identification number which has been registered in advance at his side and confirms whether or not they match. If they match here, the user is identified and becomes able to obtain the desired reception.

As abovementioned, the following problems exist in the conventional identifying system using a communication device:

1. In the case where the personal identification number is leaked to another person, there is a risk that it will be abused by someone other than the user (client) and that the confirmation of an individual is difficult.
2. At the stage of identifying an individual, the communication cost rises because, at least, the personal identification data is transmitted from user to the opposite end and the opposite end (server) transmits the result of identification to the user. Further, as there are many exchanges of data between user and the opposite end, if communication is cut by any kind of error, the identification process would be required to be carried out again from the beginning and the process is complicated.
3. When the user forgets his (her) personal identification number, a personal identification number should be registered again at the opposite end.
4. When inputting the personal identification number to communication device, the input by operating keys takes time.

SUMMARY OF THE INVENTION

The present invention aims to solve the abovementioned problems.

In this invention, the process of identifying an individual is carried out by using only the communication device and the confirmation of whether the operator is the person himself or herself is carried out by checking the biological information of the user by the communication device. In this specification, the biological information means information on a physical feature that a human being naturally has and makes it further possible to identify a human individual, such as the fingerprint, palm print or voice print. The identification process of an individual is carried out by inputting the biological information of the user in the communication device and the opposite end is informed of the identification only in the case where the identification has been made.

When the identification is accepted by the opposite end, the transaction with the opposite end starts. Alternatively, the opposite end may transmit the result of identification to a third party who is at the final end of the transaction and start the transaction between the user and the third party.

In the abovementioned process of identifying an individual, the biological information of the user does not match with the reference biological information which is stored in the communication device, the biological information of the user can be inputted again to the communication device. When the checking is attempted by repeatedly inputting the biological information to the communication device, it can be set up so as to inform that a match was not made after more than n attempts, if a match has not been made after more than n times of successive attempts (n is a natural number).

Further, the biological information of the user stored in the communication device can be plural. For example, it can be composed to carry out the identification process of an individual by inputting both a fingerprint and a voice print into the communication device. Furthermore, for the case where the biological information stored in the communication device is rewritten, rewriting the biological information can be carried out by sending the personal identification number required for changing the biological information to the opposite end, after the identification process of an individual was carried out once by using the communication device, and if the personal identification number matches at the opposite end.

Further, the input of biological information into the communication device is carried out by a line sensor, an area sensor, a microphone, etc., which employ CCD or photodiodes.

Abovementioned composition can diminish the risk that the personal identification number is leaked to another person and abused. Further, as there is no necessity of exchanging data between the user and the opposite end for the identification process of an individual, the cost required for the communication with the opposite end can be reduced and the complexity to repeat the identification process from the beginning can also be avoided when the communication is cut by an error. Furthermore, since the identification is carried out by means of biological information of the user, there is no need for the user to register again his or her personal identification number when forgotten. Furthermore, the time and effort of inputting the personal identification number to the communication device can be omitted.

The compositions of this invention will be described in the following.

The present invention provides a system for identifying an individual to identify a client, comprising:

a means for storing the biological information of the client;

a means for reading the biological information of the client;

a means for checking the read biological information with the stored biological information; and a means for transmitting information that they have matched to the server in the case where the checking has matched.

The present invention provides a system for identifying an individual to identify a client, comprising:

a means for storing a plurality of biological information of the client;

a means for reading the biological information of the client;

a means for checking the read biological information with the plurality of stored biological information; and a means for transmitting information that they have matched to the server in the case where the read biological information has matched with at least one of the stored plurality of information.

The present invention provides a system for identifying an individual to identify a client, comprising:

a means for storing a plurality of biological information of the client;

a means for reading a plurality of biological information of the client;

a means for checking the plurality of read biological information with the plurality of stored biological information; and a means for transmitting information that they have matched to the server in the case where each of the plurality of read biological information has matched with at least one of the plurality of stored biological information.

The present invention provides a system for identifying an individual to identify a client, comprising:

a means for storing the biological information of the client;

a means for reading the biological information of the client;

a means for checking the read biological information with the stored biological information; and a means for transmitting information that they have matched to the server in the case where the checking has matched through the Internet.

The present invention provides a system for identifying an individual to identify a client, comprising:

a means for storing a plurality of biological information of the client;

a means for reading the biological information of the client;

a means checking the read biological information with the plurality of stored biological information; and a means for transmitting information that they have matched to the server through the Internet, in the case where, as a result of checking, the read biological information has matched with at least one of the plurality of stored biological information.

The present invention provides a system for identifying an individual to identify a client, comprising:

a means for storing a plurality of biological information of the client;

a means for reading a plurality of biological information of the client;

a means for checking the plurality of read biological information with the plurality of stored biological information; and a means for transmitting information that they have matched to the server through the Internet, in the case where, as a result of checking, each of the plurality of read biological information has matched with at least one of the plurality of stored biological information.

The present invention provides a system for identifying an individual to identify a client, comprising:

a means for storing the biological information of the client;

a means for reading the biological information of the client;

a means for checking the read biological information with the stored biological information, a means for transmitting information to the server that they have matched in the case where the checking has matched; and a means by which the server transmits information to the final end of transaction with the client that the checking has matched, wherein the transaction is started between the client and the final end of transaction after the final end of transaction which has received information that the checking has matched.

The present invention provides a system for identifying an individual to identify a client, comprising:

a means for storing a plurality of biological information of the client;

a means for reading the biological information of the client;

a means for checking the read biological information with the plurality of stored biological information;

a means for transmitting information to the server that they have matched in the case where, as a result of checking, the read biological information has matched with at least one of the plurality of stored biological information; and a means by which the server transmits information to the final end of a transaction with the client that the checking has matched, wherein the transaction is started between the client and the final end of transaction after the final end of transaction which has received information that the checking has matched.

The present invention provides a system for identifying an individual to identify a client, comprising:

a means for storing a plurality of biological information of the client;

a means for reading a plurality of biological information of the client;

a means for checking the read plurality of biological information with the plurality of stored biological information;

a means for transmitting information to the server that they have matched in the case where, as a result of checking, each of the plurality of read biological information has matched with at least one of the plurality of stored biological information; and a means by which the server transmits information to the final end of transaction with the client that the checking has matched, wherein the transaction is started between the client and the final end of transaction after the final end of transaction which has received information that the checking has matched.

The present invention provides a system for identifying an individual to identify a client, comprising:

a means for storing the biological information of the client;

a means for reading the biological information of the client;

a means for checking the read biological information with the stored biological information; and a means for transmitting information to the server that the checking has matched, wherein after transmitting information that the checking has matched to the server, the personal identification number information is sent to the server and if the personal identification number matches with the number stored at the server, the stored biological information can be rewritten.

The present invention provides a system for identifying an individual to identify a client, comprising:

a means for storing a plurality of biological information of the client;

a means for reading the biological information of the client;

a means for checking the read biological information with the plurality of stored biological information; and a means for transmitting information to the server that the checking has matched in the case where the read biological information has matched with at least one of the plurality of stored biological information, wherein after transmitting information that the checking has matched to the server, the personal identification number information is sent to the server and if the personal identification number has matched with the number stored at the server, the plurality of stored biological information can be rewritten.

The present invention provides a system for identifying an individual to identify a client, comprising:

a means for storing a plurality of biological information of the client;

a means for reading a plurality of biological information of the client;

a means for checking the plurality of read biological information with the plurality of stored biological information; and a means for transmitting information to the server that the checking has matched in the case where each of the plurality of read biological information has matched with at least one of the plurality of stored biological information, wherein after transmitting information that the checking has matched to the server, the personal identification number information is sent to the server and if the personal identification number has matched with the number stored at the server, the plurality of stored biological information can be rewritten.

The present invention may be featured so as to request the identification of the client only in the case where the transaction to be made between the client and the final end of transaction satisfies the conditions which are set at the server.

Said biological information may be a fingerprint, a palm pattern or a voice print.

Said palm pattern may be a whole pattern of the palm or a pattern of a part of the palm.

Said means for storing the biological information of the client may be a flash memory.

Said means for reading the biological information of the client may be a photodiode or a CCD.

The present invention may be featured so as to use a portable information terminal, a portable telephone or a personal computer.

BRIEF DESCRIPTIONS OF THE DRAWINGS

DESCRIPTION OF THE PREFERRED EMBODIMENT

Figure 1:
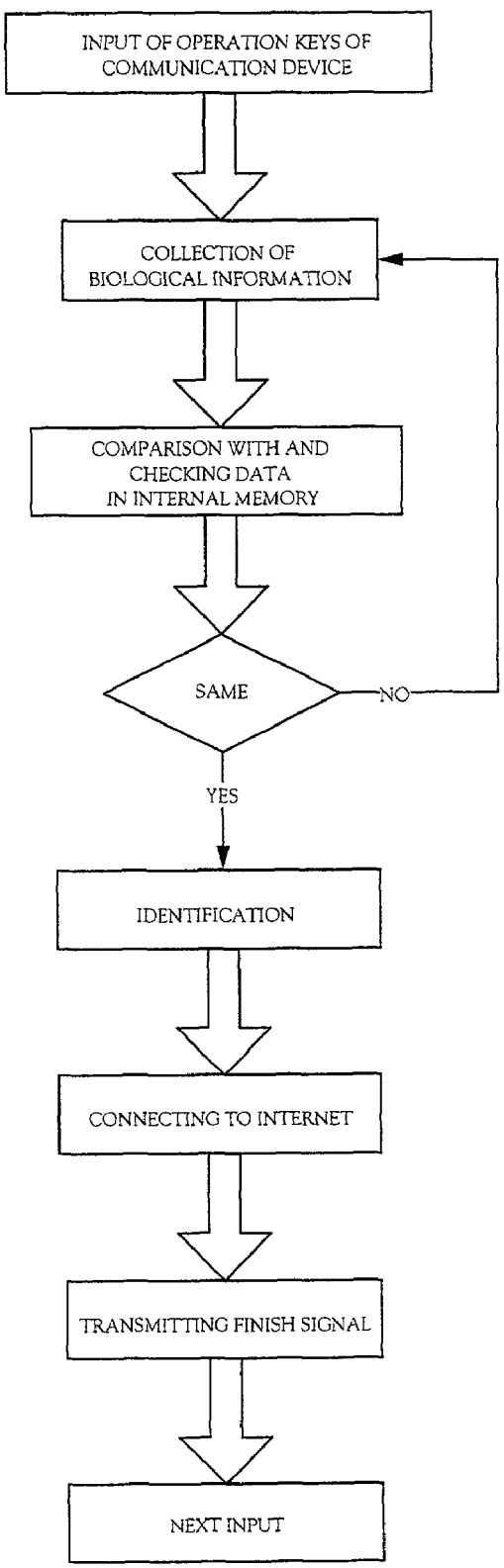
FIG. 1 is a flow of the system for identifying an individual of the present invention.

FIG. 1 shows a flow of the system for identifying an individual or the method for identifying an individual. At first the biological information is collected by operating the operation keys of communication device. If programmed in advance, it is possible to set up to start the collection of biological information by pressing only one operation key. Further, it is possible to set up to automatically start the collection of biological information when the communication device is switched on.

The biological information obtained is compared with the biological information of the person (internal memory data) which is stored in the internal memory, which is formed, for example, of a nonvolatile memory in the communication device. Here, if two of biological information are judged to be the same, the user is identified as the legitimate owner of communication device. After the identification, the data containing information that the identification has completed is transmitted to the opposite end. At this time, as the identification process has been already accomplished, another identification process with the opposite end is not required and it is sufficient for the opposite end to receive the information that the identification process has already been carried out.

The communication device used for the system for identifying an individual of this embodiment of invention has a built-in sensor or microphone. The sensor, which is used here, is a line sensor or area sensor and utilized to read the biological information of the user.

Now, the fingerprint and the palm pattern among biological information utilized in the system for identifying an individual will be described.

Figure 2:
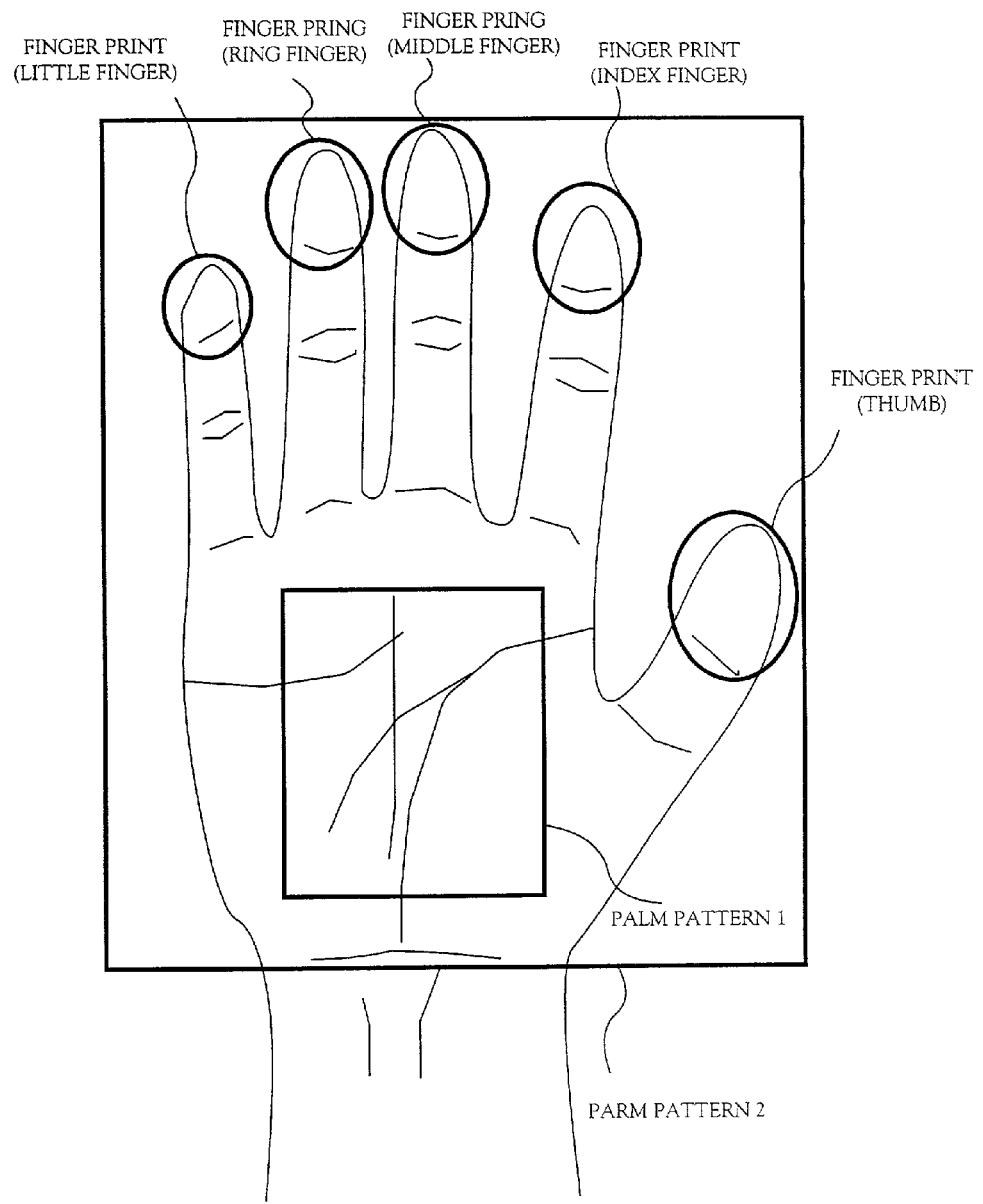
FIG. 2 is a drawing showing the position to read the palm pattern or fingerprint of the present invention.

FIG. 2 shows the right hand of human being. What is read as biological information by the communication device is the palm pattern 1 which is a part of palm, the palm pattern 2 which covers whole of the palm, the fingerprint of thumb, the fingerprint of index finger, the fingerprint of middle finger, the fingerprint of ring finger or the fingerprint of little finger. Among the abovementioned biological information, only one or a plurality of biological information can be stored in the communication device.

As the palm pattern 1 which is a part of palm, the palm pattern 2 which covers whole of the palm, the fingerprint of thumb, the fingerprint of index finger, fingerprint of middle finger, fingerprint of ring finger and the fingerprint of little finger are specific to each human being, the abuse of communication device by a third party can be avoided.

When the identification process is completed and the information of the identification completion is received by the opposite end from the communication device, a transaction is started between the user and the opposite end. Alternatively, the opposite end may transmit the result of identification to the final end of transaction, who is a third party, to let a transaction start between user and the final end of the transaction.

Figure 3:
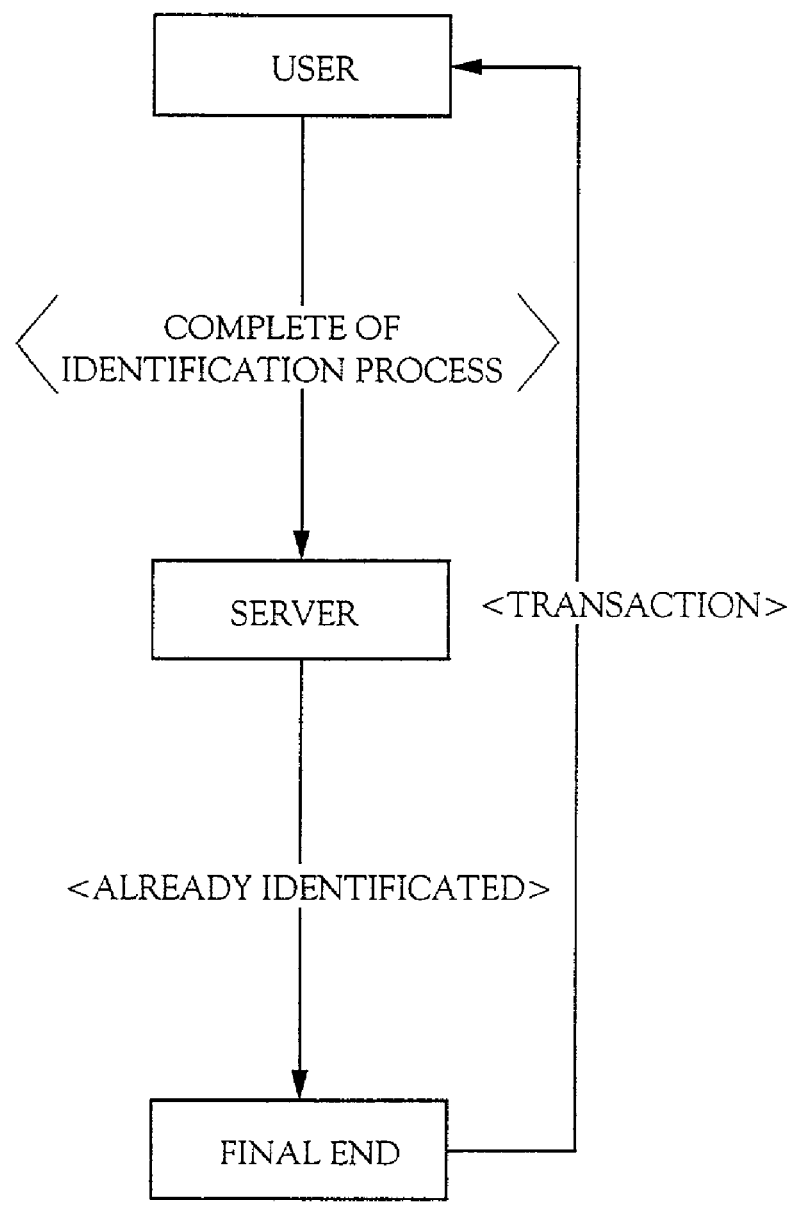
FIG. 3 is a drawing showing the relationship between a user, a server, and a final end of transaction as a third party of the present invention.

FIG. 3 shows a flow in the case where a user and the final end of the transaction, who is a third party, make a transaction. First, when the process of identifying an individual has been completed by using a communication device by the user, information that the identification process of the person has finished is transmitted from the communication device to the opposite end (server).

Further, the server in this specification corresponds to a manager of communication between the client who is a communication device user who is a client and the final end of transaction who is a third party. To be concrete, providers and others are included as managers, but the server in this specification is not limited to this and can be any one who manages the communication between the user and a third party.

The server that has received information that the identification process of an individual has finished transmits information to the final end of the transaction, who is a third party, that the identification process of the person has already been carried out. The final end of the transaction who has received that the identification process of the person has already been carried out starts a direct transaction with the user.

By the abovementioned composition, the possibility that the personal identification number is leaked to another person and abused can be diminished. Further, because there is no need to exchange data between user and the opposite end for the identification process of an individual, the cost required for the communication with the opposite end can be diminished and the complexity of repeating the identification process of an individual again from the beginning can also be avoided in the case where the communication is cut by an error. Furthermore, as the identification is carried out by means of the biological information of the user, there is no need for the user to register again his or her personal identification number to the opposite end in the case where the user forgets the personal identification number. Furthermore, the time and effort of inputting the personal identification number into the communication device.

EMBODIMENTS

In the following, examples of this invention shall be described.

Embodiment 1

In the following, the compositions of the communication device used in this invention and their actions shall be described.

Figure 4:
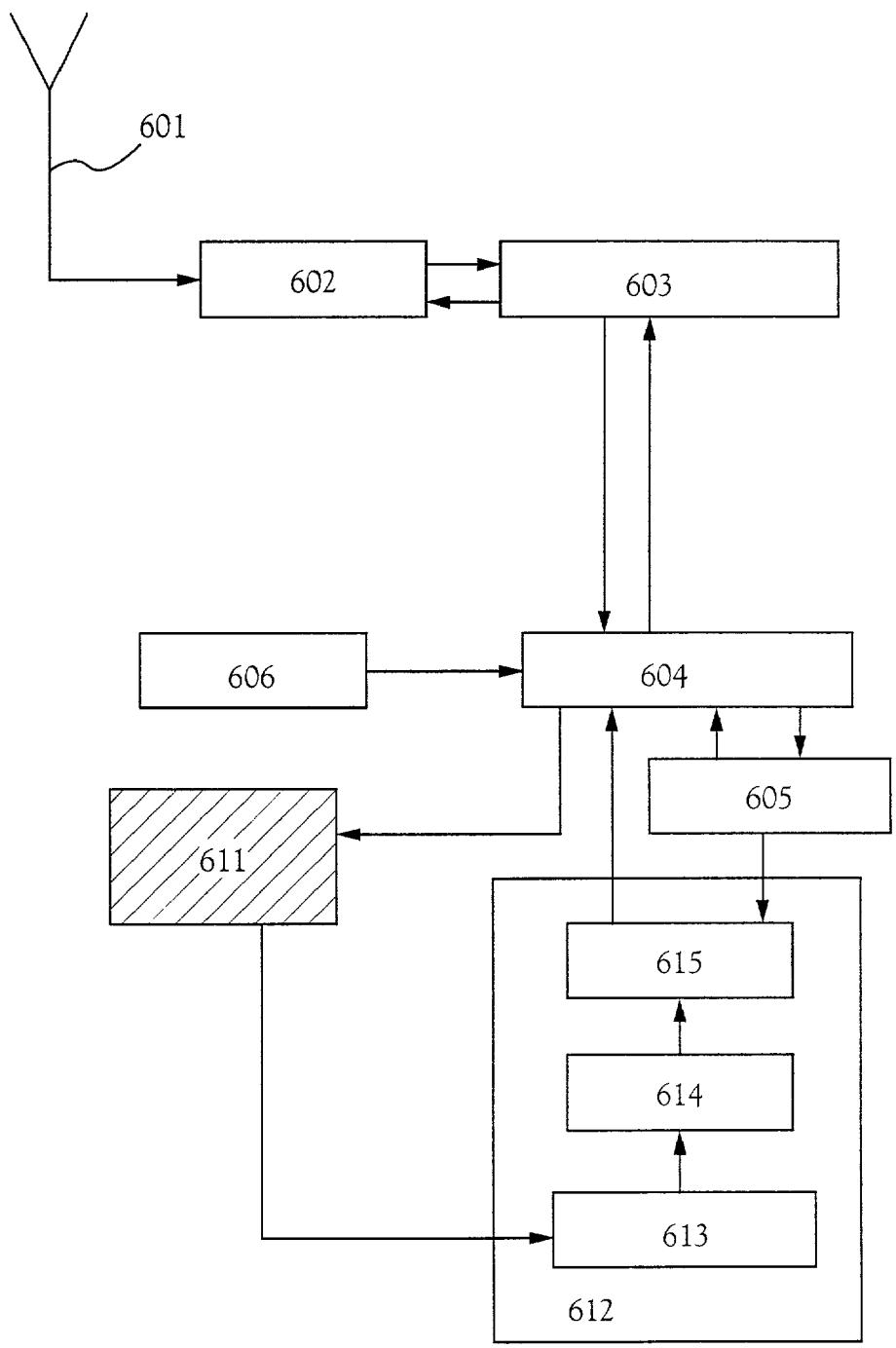
FIG. 4 is a block diagram showing the structure of the communication device of Embodiment 1.

FIG. 4 shows a block diagram of communication device of this example. This communication device has an antenna 601, a transmitting and receiving circuit 602, a signal processing circuit 603 to compress, expand and encode signals, a microcomputer 604 for control, a flash memory 605, operating keys 606, etc. It further has a sensor 611, a checking circuit part 612 and so on.

By operation of the operating keys 606, the microcomputer 604 for control controls the sensor 611 to let it read the biological information of the user. Further, in this embodiment the case where the palm pattern or fingerprint is used as the biological information will be described. The biological information of the user read by the sensor 611 is inputted into the checking circuit part 612.

The biological information of the user, which is inputted into the checking circuit part 612, is converted into digital signals at the A/D converter 613. The biological information of the user converted into digital signals is inputted into DSP (digital signal processor) 614 and subjected to signal processing. The signal processing means, in concrete, distinguishing the light and shade of an image by means of a differential filter, etc., in order to make the biological information easier to distinguish. The biological information obtained is digitized in DSP 614 and then inputted into the comparator circuit 615.

The comparator circuit 615 checks by comparing the biological information of the user of reference, which is stored in the flash memory 605, with the biological information which has been digitized in DSP 614 and inputted into the comparator circuit 615.

As for the method of checking the biological information, there are the feature collating method, which collates the collected biological information with the reference biological information by comparing the features of each of them, and the image matching method which compares directly corresponding two of the biological information, but either method can be used. Further, To make identification more sure, it is better that not only single reference data but a plurality of identification data are prepared by changing the direction of hand.

If the matching is observed here, the microcomputer 604 for control generates a identification signal, which is output from the communication device via the signal processing circuit 603, the transmitting and receiving circuit 602 and the antenna 601. The identification signal outputted from the communication device is transmitted through the Internet for example. Otherwise, the identification signal outputted from the communication device may be sent directly to the opposite end without passing through the Internet.

Embodiment 2

In the following, another composition of communication device and its actions, which are different from Embodiment 1, will be described.

Figure 5:
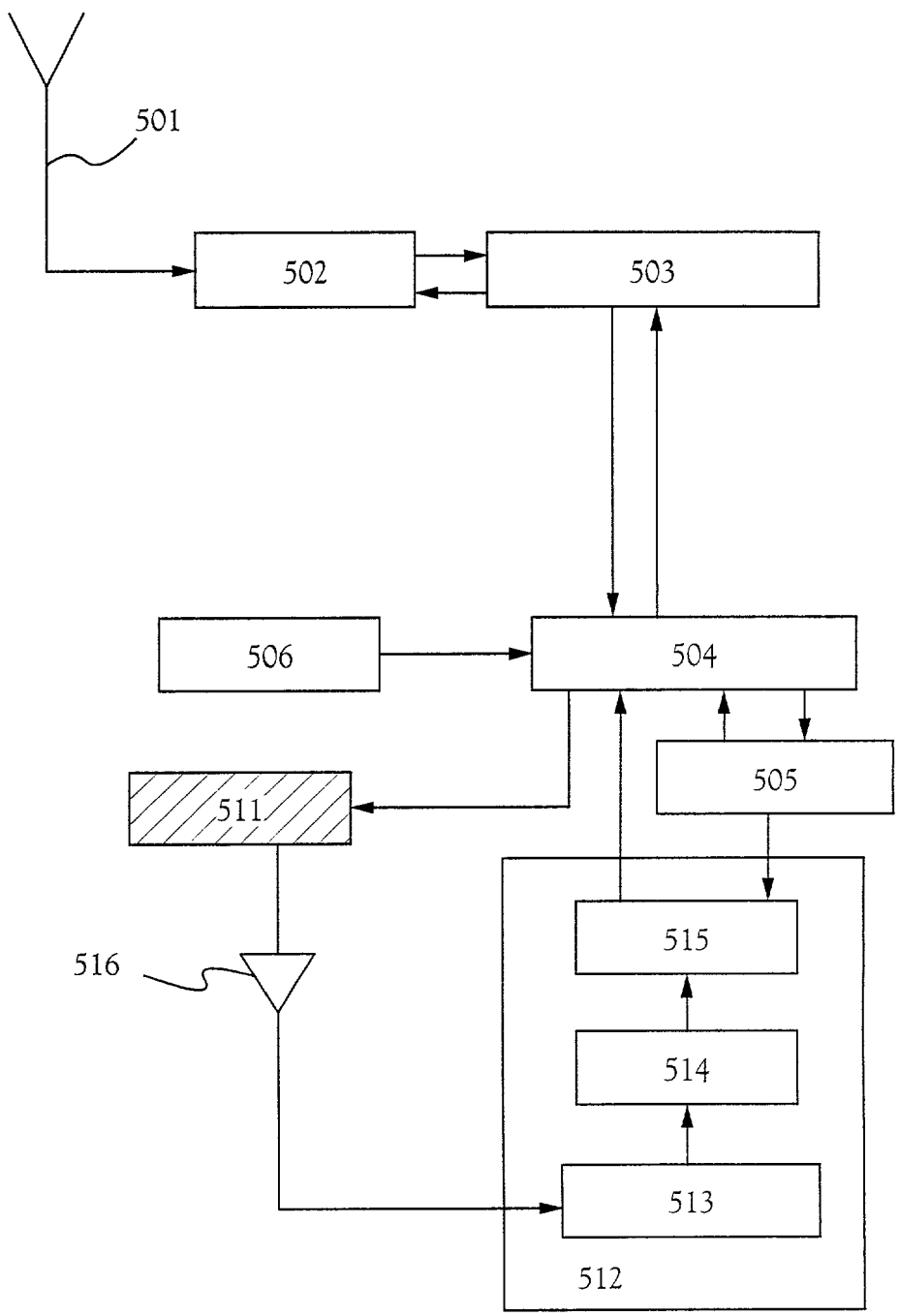
FIG. 5 is a block diagram showing the structure of the communication device of Embodiment 2.

FIG. 5 shows a block diagram of the communication device of this embodiment. This communication device has a antenna 501, a transmitting and receiving circuit 502, a signal processing circuit 503 to compress, expand and encode signals, a microcomputer 504 for control, a flash memory 505, operating keys 506, etc. It has further a microphone 511, an amplifier 516, a checking circuit part 512 and so on.

By operation of the operating keys 506, the microcomputer 504 for control controls the microphone 511 to let it read the biological information of the user. Further, in this embodiment, the case where the voice print is used as the biological information will be described. The biological information of the user read by microphone 511 is amplified by the amplifier 516 and inputted into the checking circuit part 512.

The biological information of the user inputted into the checking circuit part 512 is converted into digital signals in the A/D converter 513. The biological information of the user converted into digital signals is inputted into DSP (digital signal processor) 514 and subjected to a signal processing. The signal processing means, in concrete, digitizing the sound intensity of each frequency by means of a band-pass filter or the like in order to make the biological information easier to distinguish. The biological information digitized in DSP 514 is inputted into the comparator circuit 515.

The comparator circuit 515 checks by comparing the reference biological information of the user, which is stored in the flash memory 505, with the biological information which has been digitized in DSP 514 and inputted into the comparator circuit 515.

As for the method of checking the biological information, there are the feature collating method, which collates the collected biological information with the reference biological information by comparing the features of each of them, and the image matching method which compares directly corresponding two of the biological information, but either method can be used. Further, to make identification more sure, it is better that not only single reference data but a plurality of identification data are prepared by slightly changing the voice tone.

If the matching is observed here, the microcomputer 504 for control outputs a identification signal, which is outputted from the communication device via the signal processing circuit 503, the transmitting and receiving circuit 502 and the antenna 501. The identification signal outputted from communication device is transmitted through the Internet or the like. Alternatively, the identification signal outputted from communication device may be sent directly to the opposite end without passing through the Internet.

The composition of this example can be carried out in any combination with Embodiment 1.

Embodiment 3

Figure 6:
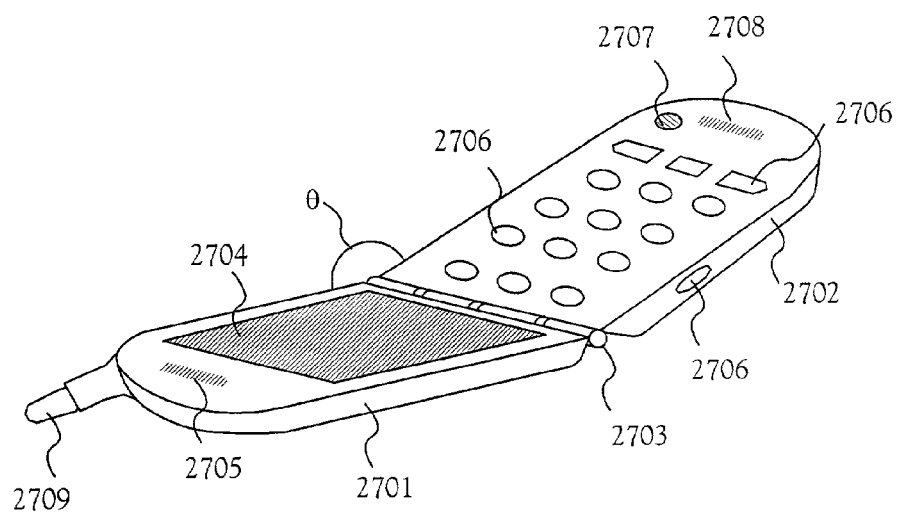
FIG. 6 is an outside view of the portable information terminal that is an example of a communication device of Embodiment 3.

Now, the portable information terminal, which is one of the communication devices used in this invention will be described. FIG. 6 shows a portable information terminal where 2701 denotes a display panel and 2702 denotes an operating panel. The display panel 2701 and the operating panel 2702 are connected at the connection part 2703. And at the connection part 2703, the angle θ between the surface on which the sensor-incorporated display 2704 of display panel 2701 is provided and the surface on which the voice input part 2708 of operating panel 2702 is provided can be changed arbitrary.

The display panel 2701 has a sensor-incorporated display 2704. The sensor-incorporated display 2704 functions not only as a sensor but also as a display and is able to display an image. In this example, an EL display is used for the sensor-incorporated display 2704.

Further, the portable information terminal shown in FIG. 6 is provided with the function of a telephone, and the display panel 2701 has a voice output part 2705, so that the voice is outputted from the voice output part 2705.

The operating panel 2702 has operating keys 2706, a power switch 2707 and a voice input part 2708. Further, although the operating keys 2706 and the power switch 2707 are provided separately in FIG. 6, they can be composed so as to contain the power switch 2707 in the operating keys 2706. The voice is inputted by the voice input part 2708.

Further, although in FIG. 6 the display panel 2701 has the voice output part 2705 and the operation panel 2702 has the voice input part 2708, this example is not limited to this composition. It is also possible that the display panel 2701 has the voice input part 2708 and the operation panel has the voice output part 2705. Further, both the voice output part 2705 and voice input part 2708 may be provided on the display panel 2701 or may be provided on the operation panel 2702.

Figure 7:
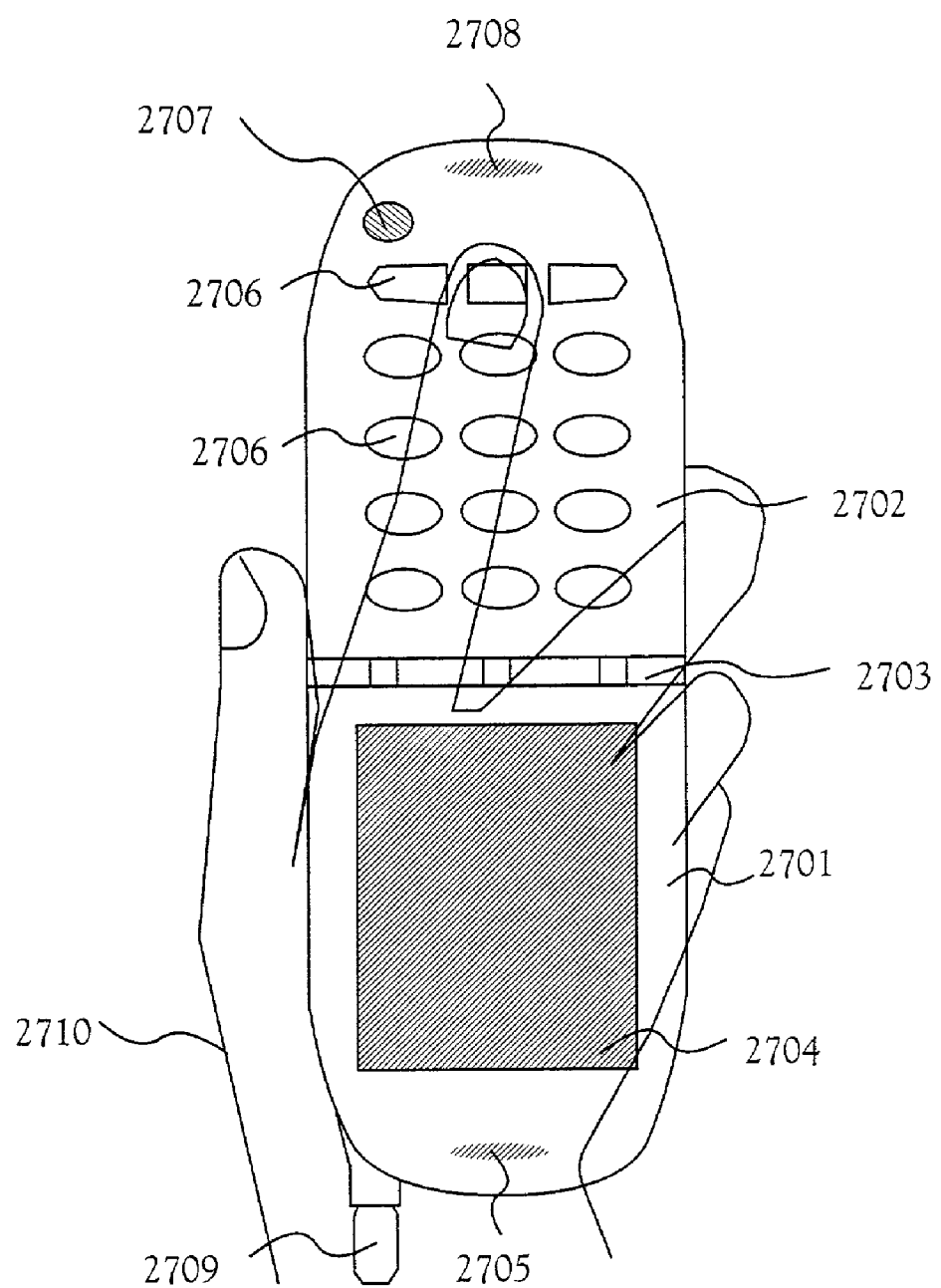
FIG. 7 is an example of use of the portable information terminal that is an example of a communication device of Embodiment 3.
Figure 8:
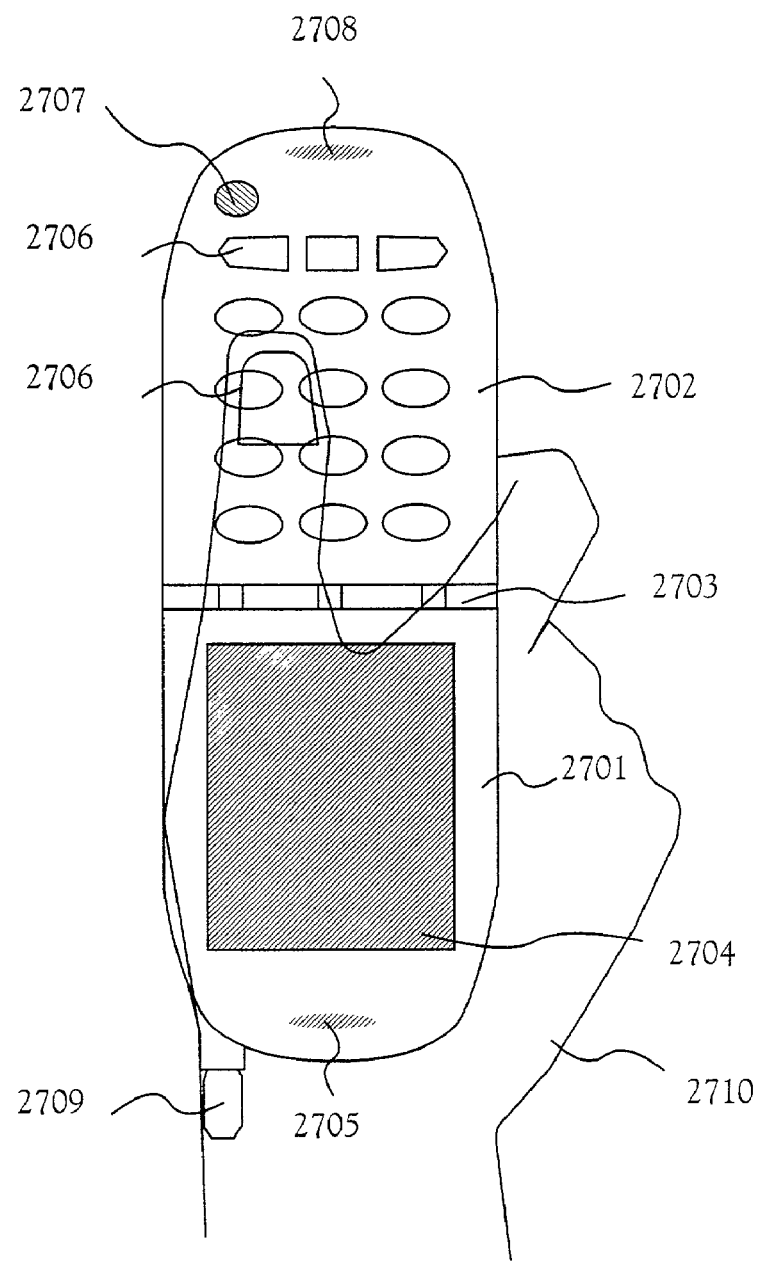
FIG. 8 is an example of use of the portable information terminal that is an example of a communication device of Embodiment 3.

With reference to FIG. 7 and FIG. 8, the method of use of the portable information terminal shown in FIG. 6 will be described. As shown in FIG. 7, when executing the identification by means of the portable information terminal, it is used by covering the sensor-incorporated display 2704 by with palm of hand. The identification is carried out by operation of the operating keys 2706, the sensor-incorporated display 2704 reads the palm pattern of the user and executes the identification process.

Further, although in FIG. 7 an example of operation of the operating keys 2706 by the index finger is shown, the operating keys 2706 can be operated also by the thumb as shown in FIG. 8. Further, the operating keys 2706 may be provided on the side of operation panel 2702. The operation is possible by only the index finger or thumb of one (dominant) hand.

In the following, the composition of portable information terminal shown in FIG. 6 and its actions will be described.

Figure 9:
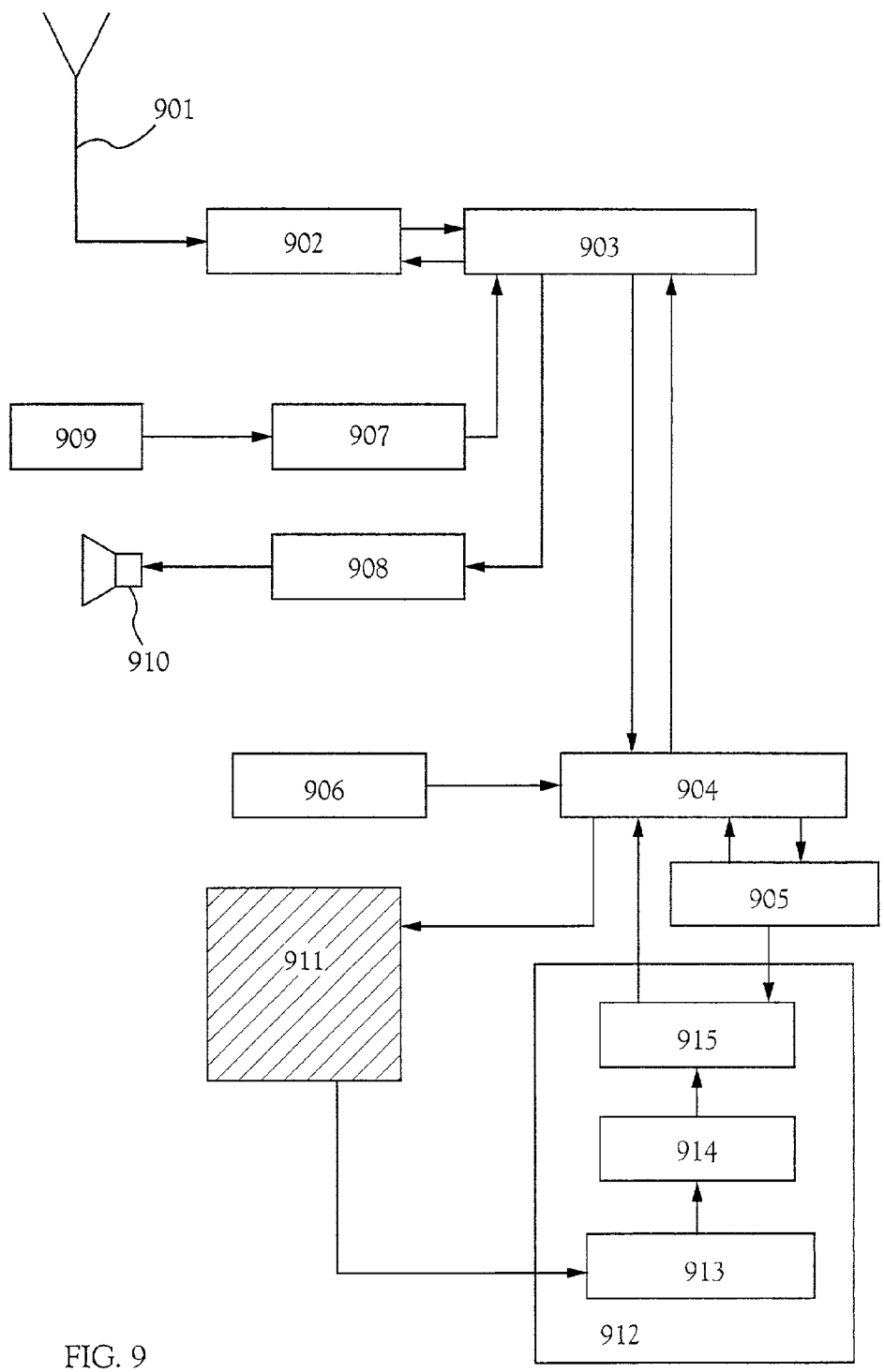
FIG. 9 is a block diagram showing the structure of the portable information terminal that is an example of a communication device of Embodiment 3.

FIG. 9 shows a block diagram of a portable information terminal of this embodiment. This portable information terminal has an antenna 901, a transmitting and receiving circuit 902, a signal processing circuit 903 to compress, expand and encode signals, a microcomputer 904 for control, a flash memory 905, operating keys 906, a voice input circuit 907, a voice output circuit 908, a microphone 909, a speaker 910, etc. And further this portable information terminal has a sensor 911, a checking circuit part 912 and so on.

The voice inputted by the voice input part 2708 is inputted into the microphone 909 and inputted into the voice input circuit 907 as an analog signal. The analog signal inputted into the voice input circuit 907 is amplified and converted into a digital signal, then inputted into the signal processing part 903. The digital signal, which has been compressed, expanded and encoded in the signal processing part 903, is changed in frequency in the transmitting and receiving circuit 902, amplified depending on the circumstances and transmitted from the antenna 901.

The digital signal having voice information, which has been received by the antenna 901, is changed in frequency in the transmitting and receiving circuit 902, and amplified depending on the circumstances, then inputted into the signal processing part 903. The digital signal inputted into the signal processing part 903 is compressed, expanded, encoded and inputted into the voice output circuit 908. The digital signal inputted into the voice output circuit 908 is amplified after converted into an analog signal, outputted from the speaker 910 and enters the ears of the user as a voice from the voice output part 2708.

By operation of the operating keys 906, the microcomputer 904 for control controls the sensor 911 and let it read the biological information of the user. Further, in this example, the case where a palm pattern or fingerprint is used as the biological information will be described. The biological information of the user that is read by the sensor 911 is inputted into the checking circuit part 912.

The biological information of the user inputted into the checking circuit part 912 is converted into digital signals in the A/D converter 913. The biological information of the user, which has been converted into digital signals, is inputted into DSP (digital signal processor) 914 and subjected to a signal processing. The signal processing is, in concrete, to distinguish the light and shade of an image by means of a differential filter or the like. The obtained biological information is digitized in DSP 914 and inputted into the comparator circuit 915.

The comparator circuit 915 checks by comparing the biological information, which has been digitized in DSP 914 and inputted into the comparator circuit 915, with the reference biological information which is stored in the flash memory 905.

As for the method of checking the biological information, there are the feature collating method, which compares the features of the biological information and the features of the reference biological information, and the image matching method which compares directly the abovementioned two of biological information, but either method can be used. Further, to make identification more sure, it is better that not only single reference data but a plurality of identification data are prepared by changing the direction of the hand.

If the matching is observed here, the microcomputer 904 for control generates an identification signal, and this signal is outputted from the portable information terminal via the signal processing circuit 903, transmitting and receiving circuit 902 and the antenna 901. The identification signal outputted from the portable information terminal is transmitted through the Internet and others. Otherwise, the identification signal outputted from the portable information terminal may be sent directly to the opposite end without passing through the Internet.

Further, the communication device used in this invention is not limited to the portable information terminal whose composition is shown in this embodiment. Further, although the portable information terminal shown in this embodiment utilizes the fingerprint or palm pattern as the biological information, it can be composed to use the voice print as the biological information.

Further, this example can be carried out in any combination with the example 1 or 2.

Embodiment 4

This embodiment explains the situations in which this invention is utilized. If the identification of an individual is not necessarily a highly sophisticated identification involving biological information, this invention need not be used. In case of transfer of small amounts of money, this invention is not always required.

For this reason, the invention can be arranged so that it becomes possible to select whether or not identification is made, for example, identification is selectively made only in the case where a large amount of money is to be transferred. It is possible to use it depending on the situation of the final end of transaction or to use it only when the numerical value is over a predetermined value upon setting in advance the criteria for judgment on the microcomputer for control of portable information terminal. Further, it is possible to transmit through the Internet the result of identification only when the result is required.

Further, this example can be carried out in any combination with the examples 1 through 3.

Embodiment 5

Various electronic apparatuses can be used as the communication device to be used in this invention.

Figure 10A:
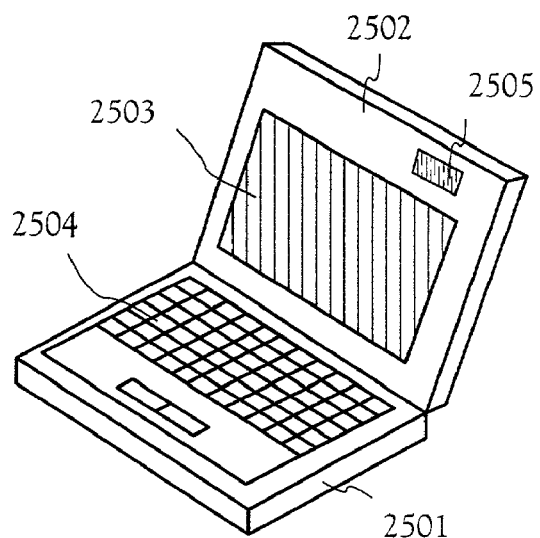
FIGS. 10A-10B are drawings of electronic apparatuses each is an example of a communication device of Embodiment 5.

FIG. 10A shows a personal computer including main body 2501, casing 2502, display 2503, keyboard 2504, sensor 2505, etc. In this invention, the biological information can be taken into the personal computer by means of the sensor 2505.

Further, although in this example the case where the fingerprint or palm pattern is utilized as the biological information has been described, it can also be provided with a voice input to utilize the voice print as the biological information.

Further, it can also be provided with both a sensor 2505 and a voice input to utilize both the fingerprint or palm pattern and the voice print.

Figure 10B:
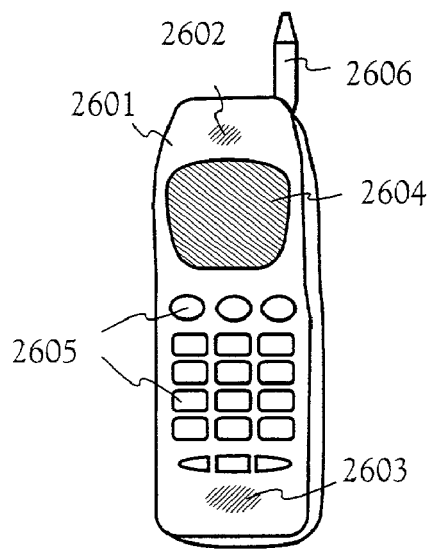
Figure 11:
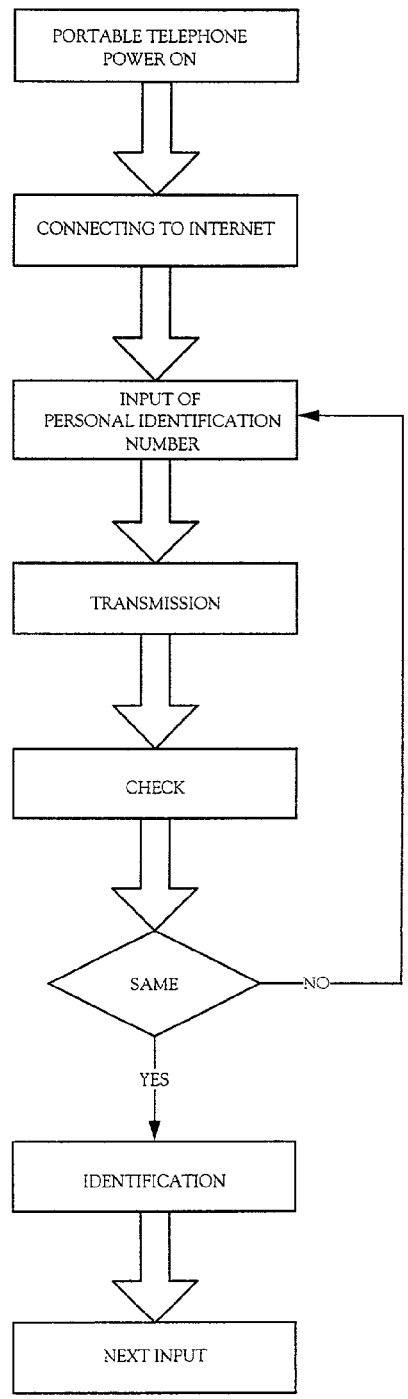
FIG. 11 is a flow chart of a prior art identification process of an individual.

FIG. 10B shows a portable telephone including the main body 2601, voice output part 2602, voice input part 2603, display 2604, operating keys 2605 and antenna 2606. During an ordinary telephone call, the phone number of the opposite end, and the condition of reception of radio waves are displayed on the display 2604. In the case where the Internet is utilized, the necessary information concerning the opposite end is displayed. Further, the display 2604 is able to function as a sensor to take in the biological information.

Further, although in the portable telephone shown in FIG. 10B the display 2604 has both functions of display and sensor, however it can be composed so that the display 2604 is used only as a display by providing a sensor separately.

Further, the communication device utilized in this invention is not limited to the electronic apparatus shown in this example. Any other electronic apparatus can be used if it is provided with functions to taken in the biological information, check the biological information with the reference biological information stored in advance, and inform the opposite end that the identification has been finished when the checking has matched.

Embodiment 6

In this embodiment, an example in which the system for identifying an individual of the invention is used in a e-commerce of virtual mall system will be described.

The virtual mall system is a type of net sales (e-commerce) where a plurality of dealers constitute together a virtual shopping mall, which allows clients to access websites of many dealers by only accessing the shopping mall.

It is supposed that the owner of a e-commerce of virtual mall system is a server. And when a client accesses the mall, it is arranged to give the right of accessing many dealers websites to the client only after identifying the client by the system for identifying an individual of this invention and transmitting the result of identification to the server.

Then, when a transaction is carried out between a dealer and the client, it can be arranged so that the dealer can draw the personal information of the client from the owner of a mall if the dealer wants it. And the dealers pay a rental fee to the owner of the mall. Further, it can be arranged so that the client pays a fee to the owner of the mall in order to access the mall.

Further, it can also be arranged so that when the client accesses for the first time to the mall and the client is identified as himself or herself, the server sends him a password and the client uses the password for the transaction with dealers. The dealers can use the password sent from the client to make an inquiry concerning the client to the server. By the use of a password, a client identifying process between different dealers in the case where the client deals with a plurality of dealers can be omitted.

By the abovementioned system, a dealer can expect, upon participation in the mail, to get more hits from clients in comparison with the case where the dealer creates a website alone.

The system for identifying an individual of this invention diminishes the risk that the personal identification number is leaked to another person and abused. Further, since there is no need to exchange data between a user and the opposite end during the identification process of an individual, the cost of communication with the opposite end can be decreased, and the complexity of repeating the identification process of an individual from the beginning when the communication is cut by an error can be avoided. Further, with the identification being carried out by means of the biological information of the user, it becomes unnecessary for the user to register again his or her personal identification number when the user forgets the number. Furthermore, the time and effort to input the personal identification number into the communication device can be omitted.

A number of variations, including systems, methods and business methods, can be employed. For example, a first system for identifying an individual to identify a client comprises: (1) a storing means for storing the biological information of the client; (2) a reading means for reading the biological information of the client; (3) a checking means for checking the read biological information with the stored biological information; and (4) a transmitting means for transmitting information that they have matched to the server in a case where the checking has matched.

A second system for identifying an individual to identify a client comprises: (1) a storing means for storing a plurality of biological information of the client; (2) a reading means for reading the biological information of the client; (3) a checking means for checking the read biological information with the plurality of stored biological information; and (4) a transmitting means for transmitting information that they have matched to the server in a case where the read biological information has matched with at least one of the stored plurality of information.

A third system for identifying an individual to identify a client comprises: (1) a storing means for storing a plurality of biological information of the client; (2) a reading means for reading a plurality of biological information of the client; (3) a checking means for checking the plurality of read biological information with the plurality of stored biological information; and (4) a transmitting means for transmitting information that they have matched to the server in a case where each of the plurality of read biological information has matched with at least one of the plurality of stored biological information.

A fourth system for identifying an individual to identify a client comprises: (1) a storing means for storing the biological information of the client; (2) a reading means for reading the biological information of the client; (3) a checking means for checking the read biological information with the stored biological information; and (4) a transmitting means for transmitting information that they have matched to the server in a case where the checking has matched through the Internet.

A fifth system for identifying an individual to identify a client comprises: (1) a storing means for storing a plurality of biological information of the client; (2) a reading means for reading the biological information of the client; (3) a checking means for checking the read biological information with the plurality of stored biological information; and (4) a transmitting means for transmitting information that they have matched to the server through the Internet, in a case where the read biological information has matched with at least one of the plurality of stored biological information.

A sixth system for identifying an individual to identify a client comprises: (1) a storing means for storing a plurality of biological information of the client; (2) a reading means for reading a plurality of biological information of the client; (3) a checking means for checking the plurality of read biological information with the plurality of stored biological information; and (4) a transmitting means for transmitting information that they have matched to the server through the Internet, in a case where each of the plurality of read biological information has matched with at least one of the plurality of stored biological information.

A seventh system for identifying an individual to identify a client comprises: (1) a reading means for reading biological information of the client; (2) a checking means for checking the read biological information with reference biological information; and (3) a transmitting means for transmitting information that they have matched to the server in a case where the checking has matched.

An eighth system for identifying an individual to identify a client comprises: (1) a reading means for reading biological information of the client; (2) a checking means for checking the read biological information with reference biological information; (3) a transmitting means for transmitting information that they have matched to the server in a case where the checking has matched; and (4) a transmitting means for transmitting information that a communication between a user and the server is admitted to a portable information terminal after the server has received the information that the checking has matched.

A ninth system for identifying an individual to identify a client comprises: (1) a reading means for reading biological information of the client; (2) a checking means for checking the read biological information with reference biological information; and (3) a transmitting means for transmitting information that they have matched to the server in a case where the checking has matched through the Internet.

A tenth system for identifying an individual to identify a client comprises: (1) a reading means for reading biological information of the client; (2) a checking means for checking the read biological information with reference biological information; (3) a transmitting means for transmitting information that they have matched to the server in a case where the checking has matched through the Internet; and (4) a transmitting means for transmitting information that a communication between a user and the server is admitted to a portable information terminal after the server has received the information that the checking has matched.

An eleventh system for identifying an individual to identify a client comprises: (1) a storing means for storing the biological information of the client; (2) a reading means for reading the biological information of the client; (3) a checking means for checking the read biological information with the stored biological information; (4) a transmitting means for transmitting information to the server that they have matched in a case where the checking has matched; and (5) a transmitting means by which the server transmits information to final end of transaction with the client that the checking has matched. The transaction is started between the client and the final end of transaction after the final end of transaction has received information that the checking has matched.

A twelfth system for identifying an individual to identify a client comprises: (1) a storing means for storing a plurality of biological information of the client; (2) a reading means for reading the biological information of the client; (3) a checking means for checking the read biological information with the plurality of stored biological information; (4) a transmitting means for transmitting information to the server that they have matched in a case where the read biological information has matched with at least one of the plurality of stored biological information; and (5) a transmitting means by which the server transmits information to final end of a transaction with the client that the checking has matched. The transaction is started between the client and the final end of transaction after the final end of transaction has received information that the checking has matched.

A thirteenth system for identifying an individual to identify a client comprises: (1) a storing means for storing a plurality of biological information of the client; (2) a reading means for reading a plurality of biological information of the client; (3) a checking means for checking the read plurality of biological information with the plurality of stored biological information; (4) a transmitting means for transmitting information to the server that they have matched in a case where each of the plurality of read biological information has matched with at least one of the plurality of stored biological information; and (5) a transmitting means by which the server transmits information to final end of transaction with the client that the checking has matched. The transaction is started between the client and the final end of transaction after the final end of transaction has received information that the checking has matched.

A fourteenth system for identifying an individual to identify a client comprises: (1) a storing means for storing the biological information of the client; (2) a reading means for reading the biological information of the client; (3) a checking means for checking the read biological information with the stored biological information; and (4) a transmitting means for transmitting information to the server that the checking has matched. After transmitting information that the checking has matched to the server, a personal identification number information is sent to the server and in a case that the personal identification number matches with a number stored at the server, the stored biological information can be rewritten.

A fifteenth system for identifying an individual to identify a client comprises: (1) a storing means for storing a plurality of biological information of the client; (2) a reading means for reading the biological information of the client; (3) a checking means for checking the read biological information with the plurality of stored biological information; and (4) a transmitting means for transmitting information to the server that the checking has matched in a case where the read biological information has matched with at least one of the plurality of stored biological information. After transmitting information that the checking has matched to the server, a personal identification number information is sent to the server and in a case that the personal identification number has matched with a number stored at the server, the plurality of stored biological information can be rewritten.

A sixteenth system for identifying an individual to identify a client comprises: (1) a storing means for storing a plurality of biological information of the client; (2) a reading means for reading a plurality of biological information of the client; (3) a means for checking the plurality of read biological information with the plurality of stored biological information; (3) a checking means for transmitting information to the server that the checking has matched in a case where each of the plurality of read biological information has matched with at least one of the plurality of stored biological information. After transmitting information that the checking has matched to the server, a personal identification number information is sent to the server and in a case that the personal identification number has matched with a number stored at the server, the plurality of stored biological information can be rewritten.

In the eleventh, twelfth, and thirteenth systems, the identifying of the client may be requested only in a case where the transaction to be made between the client and the final end of transaction satisfies conditions which are set at the server.

In the first, fourth, eleventh, and fourteenth systems, the biological information may be one selected from the group consisting of a fingerprint, a palm pattern and a voice print. The palm pattern may be a whole pattern of the palm or a pattern of a part of the palm.

In the second, third, ninth, tenth, twelfth, thirteenth, fifteenth, and sixteenth systems, each of the biological information may be one selected from the group consisting of a fingerprint, a palm pattern and a voice print. The palm pattern may be a whole pattern of the palm or a pattern of a part of the palm.

In the systems described above, the storing means may include a flash memory, the reading means may include a photodiode or a CCD, a portable information terminal may be used, a portable telephone may be used, and/or a personal computer may be used.

In a first method for identifying an individual to identify a client, the method comprises: (1) storing the biological information of the client using a storing means; (2) reading the biological information of the client using a reading means; (3) checking the read biological information with the stored biological information using a checking means; and (4) transmitting information that they have matched to the server in a case where the checking has matched using a transmitting means.

In a second method for identifying an individual to identify a client, the method comprises: (1) storing a plurality of biological information of the client using a storing means; (2) reading the biological information of the client using a reading means; (3) checking the read biological information with the plurality of stored biological information using a checking means; and (4) transmitting information that they have matched to the server in a case where the read biological information has matched with at least one of the stored plurality of information using a transmitting means.

In a third method for identifying an individual to identify a client, the method comprises: (1) storing a plurality of biological information of the client using a storing means; (2) reading a plurality of biological information of the client using a reading means; (3) checking the plurality of read biological information with the plurality of stored biological information using a checking means; and (4) transmitting information that they have matched to the server in a case where each of the plurality of read biological information has matched with at least one of the plurality of stored biological information using a transmitting means.

In a fourth method for identifying an individual to identify a client, the method comprises: (1) storing the biological information of the client using a storing means; (2) reading the biological information of the client using a reading means; (3) checking the read biological information with the stored biological information using a checking means; and (4) transmitting information that they have matched to the server in a case where the checking has matched through the Internet by using a transmitting means.

In a fifth method for identifying an individual to identify a client, the method comprises: (1) storing a plurality of biological information of the client using a storing means; (2) reading the biological information of the client using a reading means; (3) checking the read biological information with the plurality of stored biological information using a checking means; and (4) transmitting information that they have matched to the server through the Internet, in a case where the read biological information has matched with at least one of the plurality of stored biological information using a transmitting means.

In a sixth method for identifying an individual to identify a client, the method comprises: (1) storing a plurality of biological information of the client using a storing means; (2)

reading a plurality of biological information of the client using a reading means; (3) checking the plurality of read biological information with the plurality of stored biological information using a checking means; and (4) transmitting information that they have matched to the server through the Internet, in a case where each of the plurality of read biological information has matched with at least one of the plurality of stored biological information by using a transmitting means.

In a seventh method for identifying an individual to identify a client, the method comprises: (1) reading biological information of the client using a reading means; (2) checking the read biological information with reference biological information using a checking means; and (3) transmitting information that they have matched to the server in a case where the checking has matched using a transmitting means.

In an eighth method for identifying an individual to identify a client, the method comprises: (1) reading biological information of the client using a reading means; (2) checking the read biological information with reference biological information using a checking means; (3) transmitting information that they have matched to the server in a case where the checking has matched using a transmitting means; and (4) transmitting information that a communication between a user and the server is admitted to a portable information terminal after the server has received the information that the checking has matched using a transmitting means.

In a ninth method for identifying an individual to identify a client, the method comprises: (1) reading biological information of the client using a reading means; (2) checking the read biological information with reference biological information using a checking means; and (3) transmitting information that they have matched to the server in a case where the checking has matched through the Internet using a transmitting means.

In a tenth method for identifying an individual to identify a client, the method comprises: (1) reading biological information of the client using a reading means; (2) checking the read biological information with reference biological information using a checking means; (3) transmitting information that they have matched to the server in a case where the checking has matched through the Internet using a transmitting means; and (4) transmitting information that a communication between a user and the server is admitted to a portable information terminal after the server has received the information that the checking has matched using a transmitting means.

In an eleventh method for identifying an individual to identify a client, the method comprises: (1) storing the biological information of the client using a storing means; (2) reading the biological information of the client using a reading means; (3) checking the read biological information with the stored biological information using a checking means, (4) transmitting information to the server that they have matched in a case where the checking has matched using a transmitting means; and (5) the server transmitting information to final end of transaction with the client that the checking has matched by using a transmitting means. The transaction is started between the client and the final end of transaction after the final end of transaction has received information that the checking has matched.

In a twelfth method for identifying an individual to identify a client, the method comprises: (1) storing a plurality of biological information of the client using a storing means; (2) reading the biological information of the client using a reading means; (3) checking the read biological information with the plurality of stored biological information using a checking means; (4) transmitting to the server that they have matched in a case where the read biological information has matched with at least one of the plurality of stored biological information using a transmitting means; and (5) the server transmitting information to final end of a transaction with the client that the checking has matched by using a transmitting means. The transaction is started between the client and the final end of transaction after the final end of transaction has received information that the checking has matched.

In a thirteenth method for identifying an individual to identify a client, the method comprises: (1) storing a plurality of biological information of the client using a storing means; (2) reading a plurality of biological information of the client using a reading means; (3) checking the read plurality of biological information with the plurality of stored biological information using a checking means; (4) transmitting information to the server that they have matched in a case where each of the plurality of read biological information has matched with at least one of the plurality of stored biological information using a transmitting means; and (5) the server transmitting information to final end of transaction with the client that the checking has matched by using a transmitting means. The transaction is started between the client and the final end of transaction after the final end of transaction has received information that the checking has matched.

In a fourteenth method for identifying an individual to identify a client, the method comprises: (1) storing the biological information of the client using a storing means; (2) reading the biological information of the client using a reading means; (3) checking the read biological information with the stored biological information using a checking means; and (4) transmitting information to the server that the checking has matched using a transmitting means. After transmitting information that the checking has matched to the server, a personal identification number information is sent to the server and in a case that the personal identification number matches with a number stored at the server, the stored biological information can be rewritten.

In a fifteenth method for identifying an individual to identify a client, the method comprises: (1) storing a plurality of biological information of the client using a storing means; (2) reading the biological information with the plurality of stored biological information using a reading means; (3) checking the read biological information with the stored biological information using a checking means; and (4) transmitting information to the server that the checking has matched in a case where the read biological information has matched with at least one of the plurality of stored biological information using a transmitting means. After transmitting information that the checking has matched to the server, a personal identification number information is sent to the server and in a case that the personal identification number has matched with a number stored at the server, the plurality of stored biological information can be rewritten.

In a sixteenth method for identifying an individual to identify a client, the method comprises: (1) storing a plurality of biological information of the client using a storing means; (2) reading a plurality of biological information of the client using a reading means; (3) checking the plurality of read biological information with the plurality of stored biological information; and (4) transmitting information to the server that the checking has matched in a case where each of the plurality of read biological information has matched with at least one of the plurality of stored biological information using a checking means. After transmitting information that the checking has matched to the server, a personal identification number information is sent to the server and in a case that the personal identification number has matched with a number stored at the server, the plurality of stored biological information can be rewritten.

In the eleventh, twelfth, and thirteenth methods, the identifying of the client may be requested only in a case where the transaction to be made between the client and the final end of transaction satisfies conditions which are set at the server.

In the first, fourth, eleventh, and fourteenth methods, the biological information may be one selected from the group consisting of a fingerprint, a palm pattern and a voice print. The palm pattern may be a whole pattern of the palm or a pattern of a part of the palm.

In the second, third, ninth, tenth, twelfth, thirteenth, fifteenth, and sixteenth methods, each of the biological information may be one selected from the group consisting of a fingerprint, a palm pattern and a voice print. The palm pattern may be a whole pattern of the palm or a pattern of a part of the palm.

In the methods described above, the storing means may include a flash memory, the reading means may include a photodiode or a CCD, a portable information terminal may be used, a portable telephone may be used, and/or a personal computer may be used.

In a business method using Internet, the business method comprises: (1) an identifying element to identify a client; and (2) a control element for controlling a communication between the client and a plurality of dealers. The identifying element comprises: (a) a reading means for reading biological information of the client; (b) a checking means for checking the read biological information with reference biological information; and (c) a transmitting means for transmitting information that they have matched to the control element in a case where the checking has matched. The control element comprises: (a) an admitting means for admitting the communication between the client and the plurality of dealers after identifying the client by the control element; and (b) a providing means for providing a password to the client.

What is claimed is:

1. A system for identifying a client, the system comprising a server and a portable communication device,
   wherein the portable communication device comprises:
   a switch for turning on the portable communication device;
   a nonvolatile memory for storing at least one reference biological information of the client using the portable communication device, the stored biological information being stored in the nonvolatile memory prior to turning on the portable communication device;
   a sensor for reading at least one biological information of the client after using the switch to turn on the portable communication device;
   a checking circuit for performing an identification process to confirm an identity of the client by checking the read biological information with the stored biological information, wherein the checking circuit is configured to complete the identification of the client if the read biological information matches with the stored reference biological information; and
   a transmitting circuit for transmitting information that the identification of the client is completed and the identity of the client is confirmed to the server,
   wherein the portable communication device is configured to complete the identification of the client without a necessity of exchanging data between the portable communication device and the server, and
   wherein the server is configured to transmit the information that the identification of the client is completed to a final end of transaction configured to start a transaction with the client conditioned upon receipt of the information that the identification of the client is completed, and
   wherein a personal identification number information is sent to the server after transmitting the information that the identification of the client is completed to the server, and the stored biological information is rewritable if the personal identification number matches with a number stored at the server and is not rewritable if the personal identification number does not match with the number stored at the server.

2. A system for identifying a client according to claim 1, wherein the nonvolatile memory stores a plurality of reference biological information of the client, and wherein the checking circuit is configured to complete the identification of the client if the read biological information has matched with at least one of the stored plurality of reference biological information to the server.

3. A system for identifying a client according to claim 2, wherein the sensor reads the plurality of biological information of the client, and wherein the checking circuit is configured to complete the identification of the client if each of the plurality of read biological information has matched with at least one of the plurality of stored reference biological information.

4. A system for identifying a client according to claim 1, wherein the information that the identification of the client is completed and the identity of the client is confirmed is transmitted to the server through the Internet.

5. A system for identifying a client according to claim 1, wherein the read biological information is one selected from the group consisting of a fingerprint, a palm pattern and a voice print.

6. A system for identifying a client according to claim 5, wherein the palm pattern is a whole pattern of the palm or a pattern of a part of the palm.

7. A system for identifying a client according to claim 1, wherein the sensor includes one of a photodiode and a CCD.

8. A system for identifying a client according to claim 1, wherein the portable communication device is a portable information terminal.

9. A system for identifying a client according to claim 1, wherein the portable communication device is a portable telephone.

10. A system for identifying a client according to claim 1, wherein the portable communication device is a personal computer.

11. A method for identifying a client, said method comprising steps of:
    turning on a portable communication device;
    reading at least one biological information of the client by a sensor in the portable communication device after turning on the portable communication device;
    performing an identification process by a checking circuit in the portable communication device to confirm an identity of the client by checking the read biological information with at least one stored reference biological information of the client, the stored reference biological information being stored in a nonvolatile memory in the portable communication device prior to turning on the portable communication device;
    using the checking circuit to complete the identification of the client if the read biological information matches with the stored reference biological information;
    and transmitting information that the identification of the client is completed and the identity of the client is confirmed from the portable communication device to a server, wherein the identification of the client is completed without a necessity of exchanging data between the portable communication device and a server, wherein the server is configured to transmit the information that the identification of the client is completed to a final end of transaction configured to start a transaction with the client conditioned upon receipt of the information that the identification of the client is completed, and wherein a personal identification number information is sent to the server after transmitting the information that the identification of the client is completed to the server, and the stored biological information is rewritable if the personal identification number matches with a number stored at the server and is not rewritable if the personal identification number does not match with the number stored at the server.

12. A method according to claim 11, wherein the nonvolatile memory stores a plurality of reference biological information of the client.

13. A method according to claim 12, wherein the checking is performed between each of a plurality of read biological information and at least one of the plurality of stored biological information.

14. A method according to claim 11, wherein the information that the identification of the client is completed and the identity of the client is confirmed is transmitted to the server through the Internet.

15. A method according to claim 11, wherein the read biological information is one selected from the group consisting of a fingerprint, a palm pattern and a voice print.

16. A method according to claim 15, wherein the palm pattern is one of a whole pattern of the palm and a part pattern of the palm.

17. A method according to claim 11, wherein the portable communication device is a portable information terminal.

18. A method according to claim 11, wherein the portable communication device is a portable telephone.

19. A method according to claim 11, wherein the portable communication device is a personal computer.

20. A business method using Internet, said business method comprising:
   identifying a client by an identifying element loaded in a portable communication device; and
   controlling a communication between the client and a plurality of dealers by a control element in a server;
   wherein said identifying step comprises:
      storing at least one reference biological information of the client in a nonvolatile memory in the portable communication device prior to turning on the portable communication device;
      turning on the portable communication device;
      reading at least one biological information of the client after turning on the portable communication device; and
      performing an identification process to confirm the identity of the client by checking the read biological information with the at least one stored reference biological information stored in the nonvolatile memory in the portable communication device;
      using the portable communication device to complete the identification of the client if the read biological information matches with the stored reference biological information; and
      transmitting information that the identification of the client is completed and the identity of the client is confirmed from the identifying element to the control element,
   wherein the identifying step is completed without a necessity of exchanging data between the portable communication device and the server, and
   wherein said controlling step comprises:
      admitting the communication between the client and the plurality of dealers after identifying the client by the identifying element; and
      providing a password to the client, and
   wherein the server is configured to transmit the information that the identification of the client is completed and the identity of the client is confirmed to a final end of transaction configured to start a transaction with the client conditioned upon receipt of the information that identification of the client is completed and the identity of the client is confirmed, and
   wherein a personal identification number information is sent to the server after transmitting the information that the identification of the client is completed to the server, and the stored biological information is rewritable if the personal identification number matches with a number stored at the server and is not rewritable if the personal identification number does not match with the number stored at the server.

21. A business method according to claim 20, wherein the read biological information is one selected from the group consisting of a fingerprint, a palm pattern and a voice print.

22. A business method according to claim 21, wherein the palm pattern is one of a whole pattern of the palm and a part pattern of the palm.

23. A business method according to claim 20, wherein the portable communication device is a portable information terminal.

24. A business method according to claim 20, wherein the portable communication device is a portable telephone.

25. A business method according to claim 20, wherein the portable communication device is a personal computer.

26. A system for identifying an individual to identify a client, said system comprising a portable communication device having:
   an activation means for turning on the portable communication device;
   a storing means for storing a reference biological information of the client prior to turning on the portable communication device;
   a reading means for reading a biological information of the client after turning on the portable communication device;
   a checking means for performing an identification process to confirm an identity of the client by checking the read biological information with the stored biological information and completing the identification of the client if the read biological information matches with the stored reference biological information; and
   a transmitting means for transmitting information to a server that the identification of the client is completed and the identity of the client is confirmed,
   wherein the checking means is configured to complete the identification of the client without a necessity of exchanging data with the server, and
   wherein a personal identification number information is sent to the server after transmitting the information that the identification of the client is completed to the server, and the stored biological information is rewritable if the personal identification number matches with a number stored at the server and is not rewritable if the personal identification number does not match with the number stored at the server.

27. A method for identifying an individual to identify a client, said method comprising:

storing at least one reference biological information of the client in a portable communication device prior to turning on the portable communication device;

reading a biological information of the client after turning on the portable communication device;

performing an identification process at the portable communication device to confirm the identity of the client by checking the read biological information with the at least one stored reference biological information of the client and completing the identification of the client if the read biological information matches with the stored reference biological information, wherein the identification process is completed without a necessity of a communication with a server, and wherein information that the identification of the client is completed and the identity of the client is confirmed is transmitted to the server after identifying the client, and wherein a personal identification number information is sent to the server after transmitting the information that the identification of the client is completed to the server, and the stored biological information is rewritable if the personal identification number matches with a number stores at the server and is not rewritable if the personal identification number does not match with the number stored at the server.

* * * * *